US 6,729,035 B1

(12) United States Patent
Carrillo (10) Patent No.: US 6,729,035 B1
(45) Date of Patent: May 4, 2004

(54) APPARATUS AND METHOD FOR A CLEAR RULED TILE TEMPLATE

(76) Inventor: Victor Carrillo, 256 Third Ave., Brooklyn, NY (US) 11215

( * ) Notice: Subject to any disclaimer, the term of this patent is extended or adjusted under 35 U.S.C. 154(b) by 0 days.

(21) Appl. No.: 10/200,386

(22) Filed: Jul. 22, 2002

(51) Int. Cl.[7] .............................. G01B 3/14; B43L 13/20
(52) U.S. Cl. ............................................ 33/566; 33/526
(58) Field of Search ........................... 33/566, 1 B, 1 G, 33/526, 527, 562, 563

(56) References Cited

U.S. PATENT DOCUMENTS

| 1,587,133 | A | * | 6/1926 | Anhof | 33/1 B |
| 4,779,346 | A | * | 10/1988 | Schafer | 33/1 B |
| 5,819,422 | A | * | 10/1998 | Schafer | 33/1 B |
| 5,924,213 | A | * | 7/1999 | Lee | 33/1 B |
| 6,449,863 | B1 | * | 9/2002 | Voorhees | 33/563 |

* cited by examiner

Primary Examiner—Christopher W. Fulton
(74) Attorney, Agent, or Firm—Michael I Kroll (57) ABSTRACT

The present invention 10 discloses a flexible, clear-ruled tile template having substantially the same dimensions as the piece of tile 14 being laid. The present invention 10 is made of a flexible material so that it can be bent against objects 32 such as walls. The property of transparency allows the user 12 to more clearly see the space 16 being measured and a grid pattern 24 affixed thereon allows the user to extend the proposed measurement across the entire tile to see what the proposed cut tile will look like. The present invention 10 has the American standard of inches 22 marked on three sides with each inch further broken down by a common measure such as eighths or sixteenths. On the fourth edge a metal plate 20 has been attached that can be used as a straight edge or cutting edge.

4 Claims, 12 Drawing Sheets

FIG. 12

APPARATUS AND METHOD FOR A CLEAR RULED TILE TEMPLATE

BACKGROUND OF THE INVENTION

1. Field of the Invention

The present invention relates generally to measurement aid and, more specifically, to a flexible clear ruled tile template of the same dimensions has the tiled being laid. The tile template is made of a flexible material so that it can be bent against objects such as walls. The property of transparency allows the user to more clearly see the space being measured and the grid pattern allows the user to extend the proposed measurement across the entire tile to see what effect the proposed cut tile will look like.

Additionally, the tile template has the American standard of inches marked on three sides with each inch further broken down by a common measure such as eighths or sixteenths. On the fourth edge a metal plate has been attached that can be used as a straight edge or cutting edge.

2. Description of the Prior Art

There are other measuring devices designed for construction and interior layout. There are other rulers, for example, which provide for adequate and accurate measurements. While these rulers may be suitable for the purposes for which they were designed, they would not be as suitable for the purposes of the present invention as heretofore described. It is thus desirable to provide the clear tile, the present invention. It is further desirable that cutting edge is provided so that the present invention can be used more efficiently for tile work without having to switch between multiple tools.

SUMMARY OF THE PRESENT INVENTION

The present invention discloses a flexible, clear-ruled tile template having substantially the same dimensions as the piece of tile being laid. The present invention is made of a flexible material so that it can be bent against objects such as walls. The property of transparency allows the user to more clearly see the space being measured and a grid pattern affixed thereon allows the user to extend the proposed measurement across the entire tile to see what the proposed cut tile will look like. The present invention has the American standard of inches marked on three sides with each inch further broken down by a common measure such as eighths or sixteenths. On the fourth edge a metal plate has been attached that can be used as a straight edge or cutting edge.

A primary object of the present invention is to provide a tile template that can be used to provide measurements for tiles to be cut.

Another object of the present invention is to provide a rigid, straight edge by which a knife can be guided for cutting tiles.

Yet another object of the present invention is to provide a tile template for accurately tracing the shape of a tile to be cut.

Still yet another object of the present invention is to provide a versatile tool for measuring by employing flexible plastic for the present invention's construction.

Another object of the present invention is to provide clear visibility through the measuring template over the tile space to be measured for accurate measurements.

Yet another object of the present invention is to provide multiple measurement edges so that a plurality of measurements can be carried out simultaneously.

Still yet another object of the present invention is to provide a single tool providing the capability of measuring and cutting tiles and thereby eliminating the need for having and switching between multiple tools in tile floor construction.

Additional objects of the present invention will appear as the description proceeds.

The present invention overcomes the shortcomings of the prior art by providing a flexible clear ruled tile template of the same dimensions has the tiled being laid. The tile template is made of a flexible material so that it can be bent against objects such as walls. The property of transparency allows the user to more clearly see the space being measured and the grid pattern allows the user to extend the proposed measurement across the entire tile to see what effect the proposed cut tile will look like.

Additionally, the tile template has the American standard of inches marked on three sides with each inch further broken down by a common measure such as eighths or sixteenths. On the fourth edge a metal plate has been attached that can be used as a straight edge or cutting edge.

The foregoing and other objects and advantages will appear from the description to follow. In the description, reference is made to the accompanying drawings, which form a part hereof, and in which is shown, by way of the illustration, specific embodiments, in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 worker
13 previously laid tile
14 tile to be cut
16 intended tile space
18 clear flexible plastic
20 metal edge
22 12 inch ruler
24 one-inch square grid
26 side length
28 measurement point
30 measurement point
32 structure
34 cut point marks
36 trace
37 impression of trace
38 wet pen
40 back of tile
42 top of present invention

DETAILED DESCRIPTION OF THE PREFERRED EMBODIMENT

The following discussion describes in detail one embodiment of the invention. This discussion should not be construed, however, as limiting the invention to those particular embodiments, since practitioners skilled in the art will recognize numerous other embodiments as well. For a definition of the complete scope of the invention, the reader is directed to the appended claims.

Figure 1:
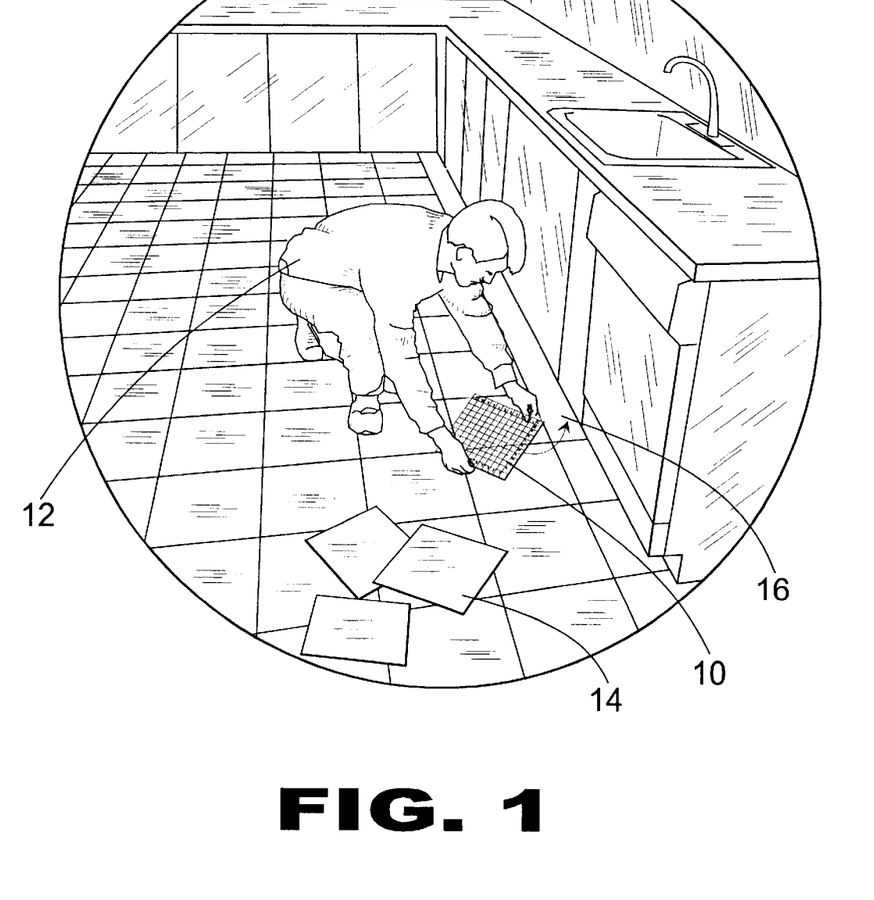
FIG. 1 is a view of a worker laying floor tiles using the present invention.

Turning to FIG. 1, shown therein is a view of a worker 12 laying floor tiles using the present invention 10. The present invention 10 is used to measure the dimensions of a tile 14 to be cut by covering over the intended tile space 16 directly with the present invention and making measurements. The transparency of the present invention 10 allows the worker 12 to be able to see the tile space 16 below and measure the dimensions around the space in one setting.

Figure 2:
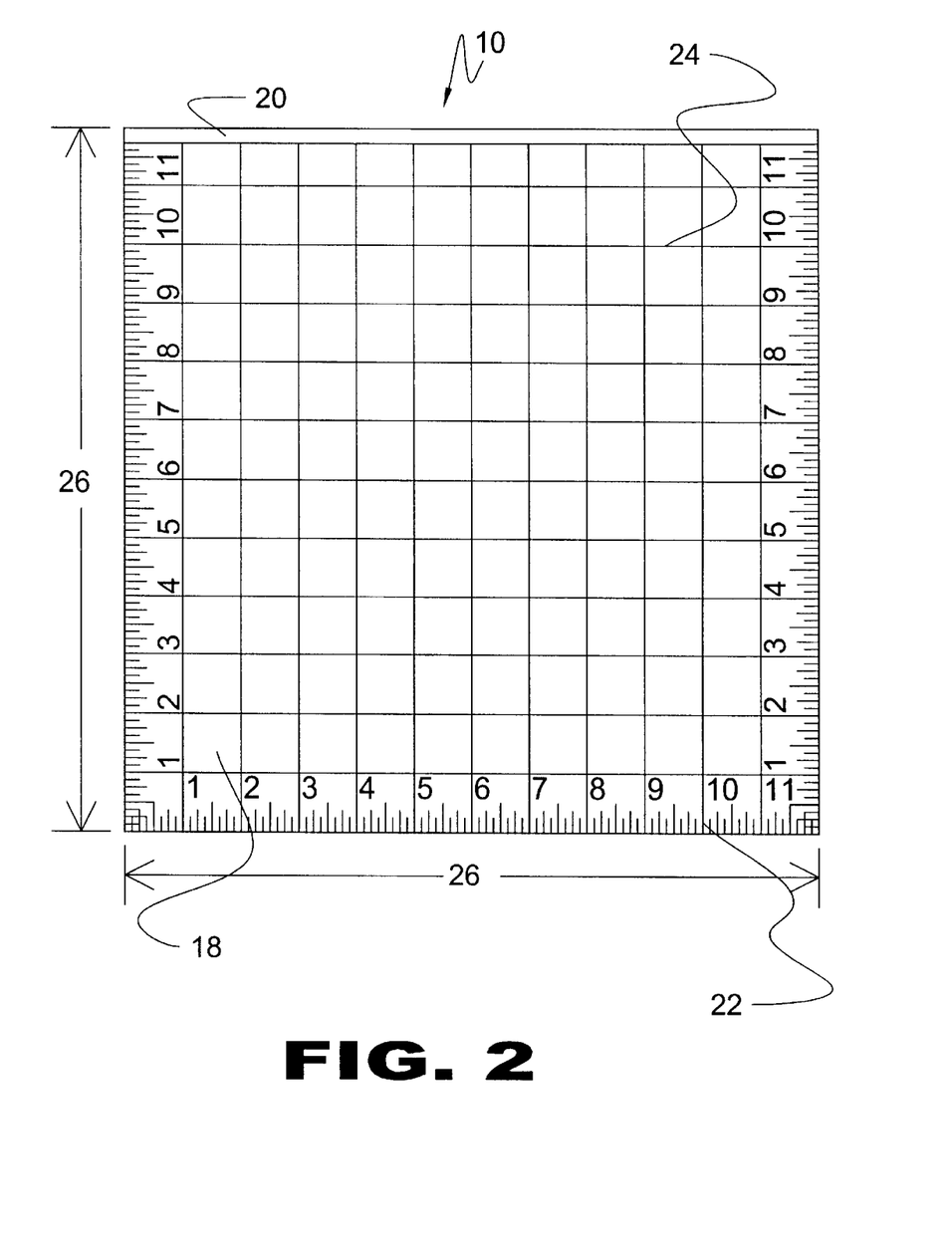
FIG. 2 is a view of the construction of the present invention.

Turning to FIG. 2, shown therein is a view of the construction of the present invention 10. The present invention is made of a clear flexible plastic 18. Placed along one side is a ¼" metal strip 20 to be used for guiding a utility knife when cutting vinyl or commercial tiles. All three other sides of the plastic are imprinted with 12" rulers 22 being 12 inches long on a side as shown at 26. This clear plastic is also grid with 1" squares 24 in the interior.

Figure 3:
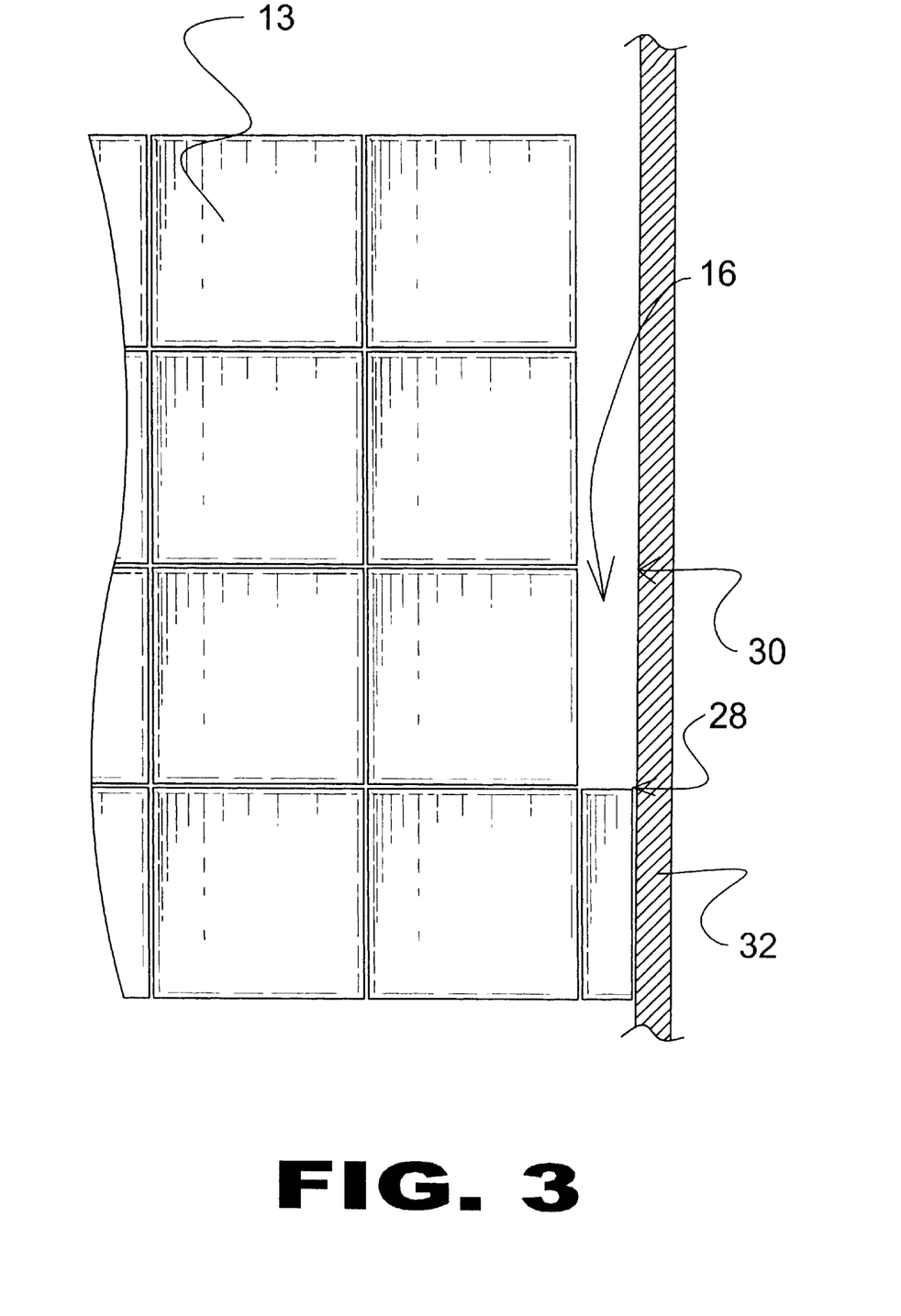
FIG. 3 is a view of a tile floor under construction.

Turning to FIG. 3, shown therein is a view of a tile floor 13 under construction. This view shows an example of how the present invention can be used next to a structure 32, e.g. a wall. Shown on the right side is an empty tile space 16 to be worked on. Normally it would require separate measurements at points 28, 30 on the two sides of a piece of tile.

Figure 4:
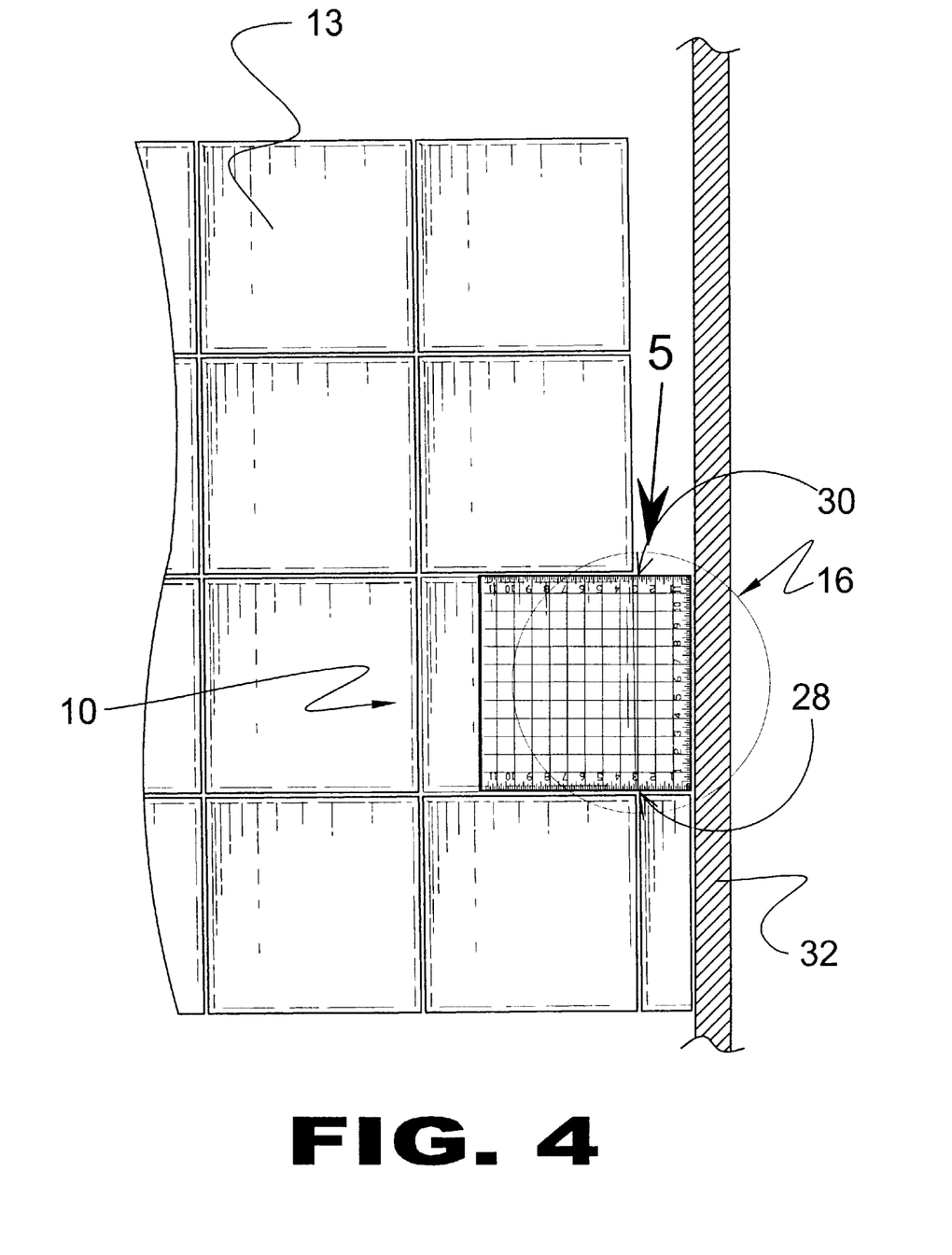
FIG. 4 is a view of the present invention in use.

Turning to FIG. 4, shown therein is a view of the present invention 10 in use. This view shows one way the present invention 10 being a clear tile, can be used. The present invention is brought over the space 16 to be filled as if it is the actual tile and laid down. Once in proper position, the worker can take measurements 28, 30 on both sides of the present invention 10 in one trial without having to move the present invention. These measurements 28, 30 are then used to mark the next tile to be cut. When the boundary is a wall 32, the worker can simply bend the present invention 10 up the wall to make measurements, as the present invention is flexible.

Figure 5:
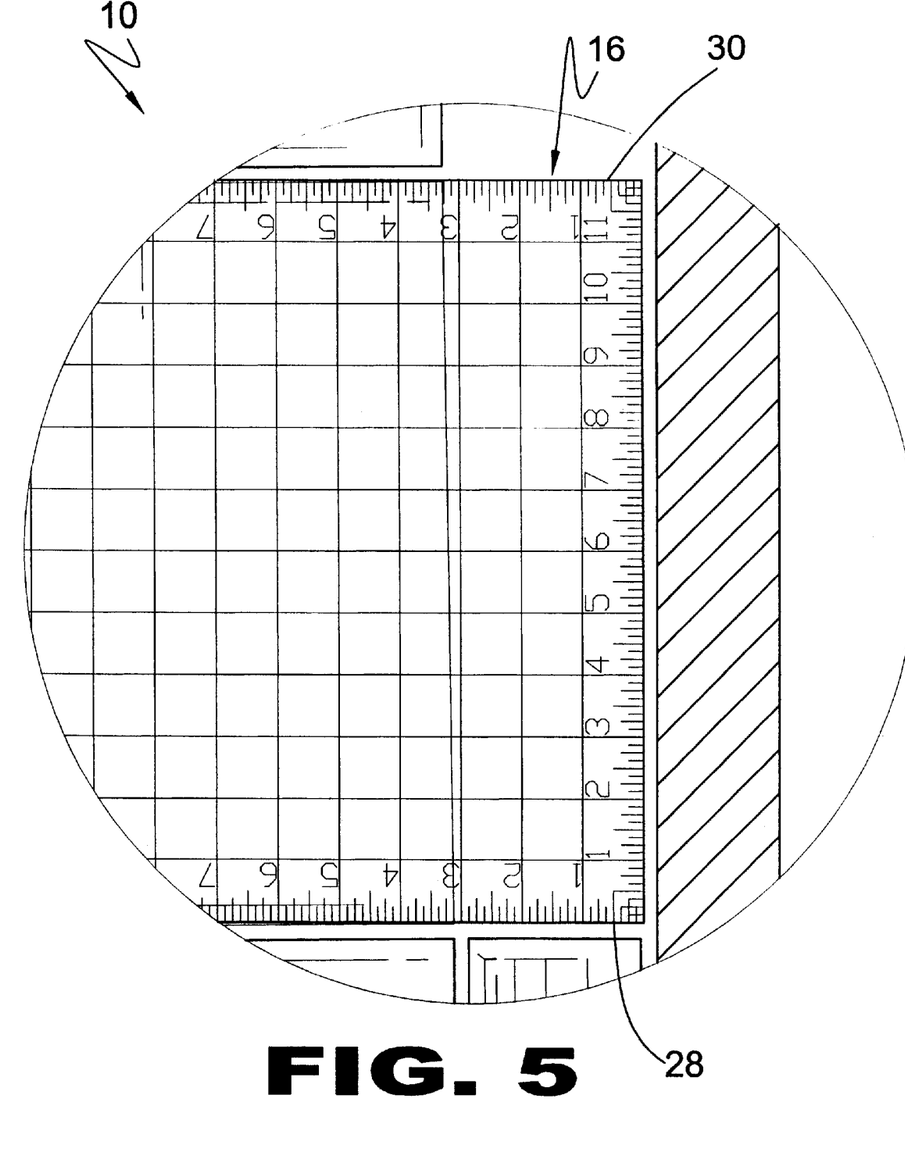
FIG. 5 is an enlarged view of the present invention in use.

Turning to FIG. 5, shown therein is an enlarged view of the present invention 10 in use. Shown is an enlarged view of the tile template 10 being used to measure a space 16 for the placement of a tile therein. The present invention 10 is brought over the space 16 to be filled as if it is the actual replacement tile and laid down. Once in proper position, a measurement 28, 30 is taken on both sides of the present invention 10 in one step without having to move the present invention 10. These measurements are then used to mark the actual replacement tile to be cut.

Figure 6:
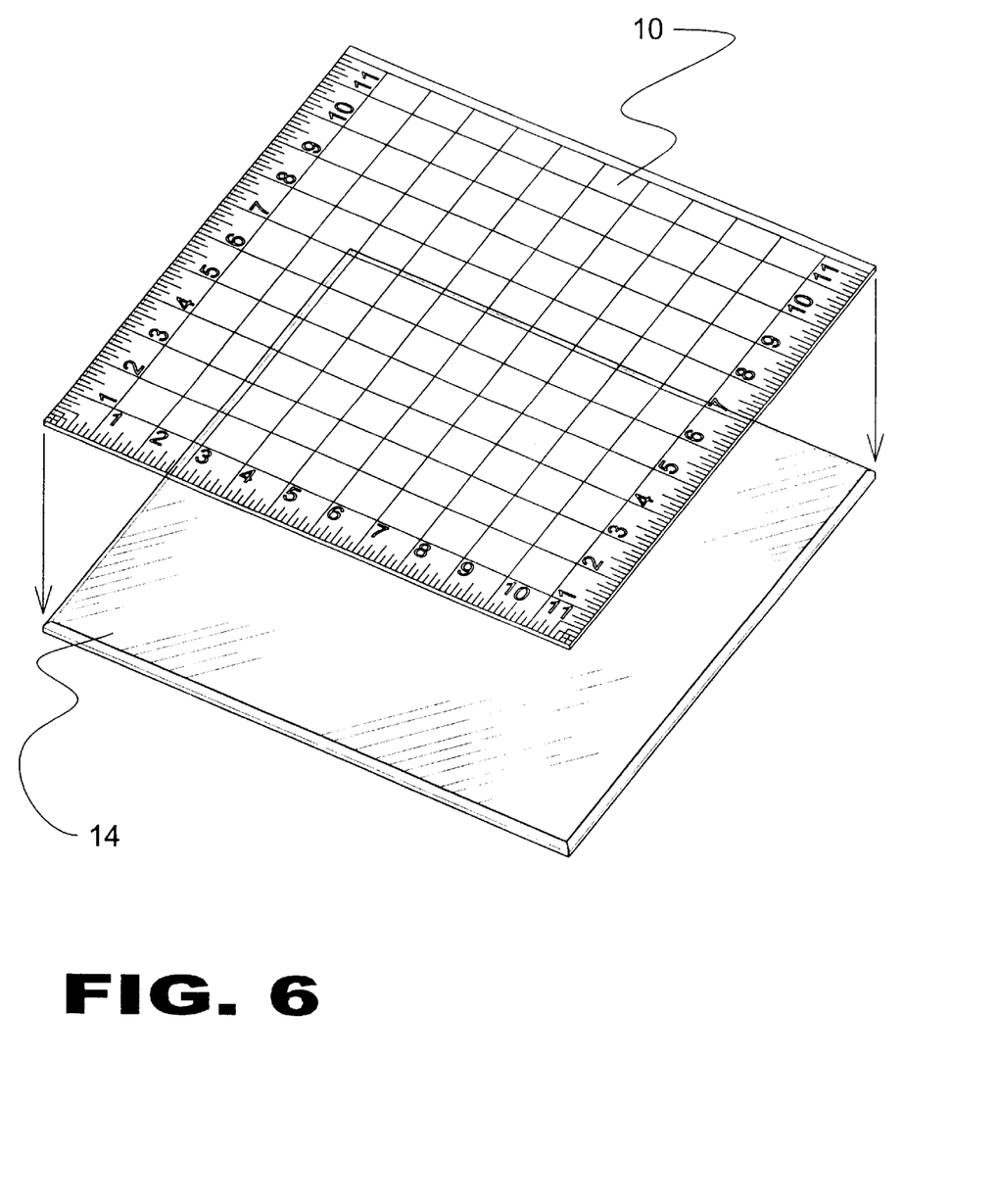
FIG. 6 is a view of the clear tile being laid on top of a tile to be cut.

Turning to FIG. 6, shown therein is a view of the present invention 10 being laid on top of an actual tile 14 to be marked and cut. Once the measurements are completed, the present invention 10 can be used to mark the tile 14 to be cut by overlaying the present invention 10 on top of the tile 14.

Figure 7:
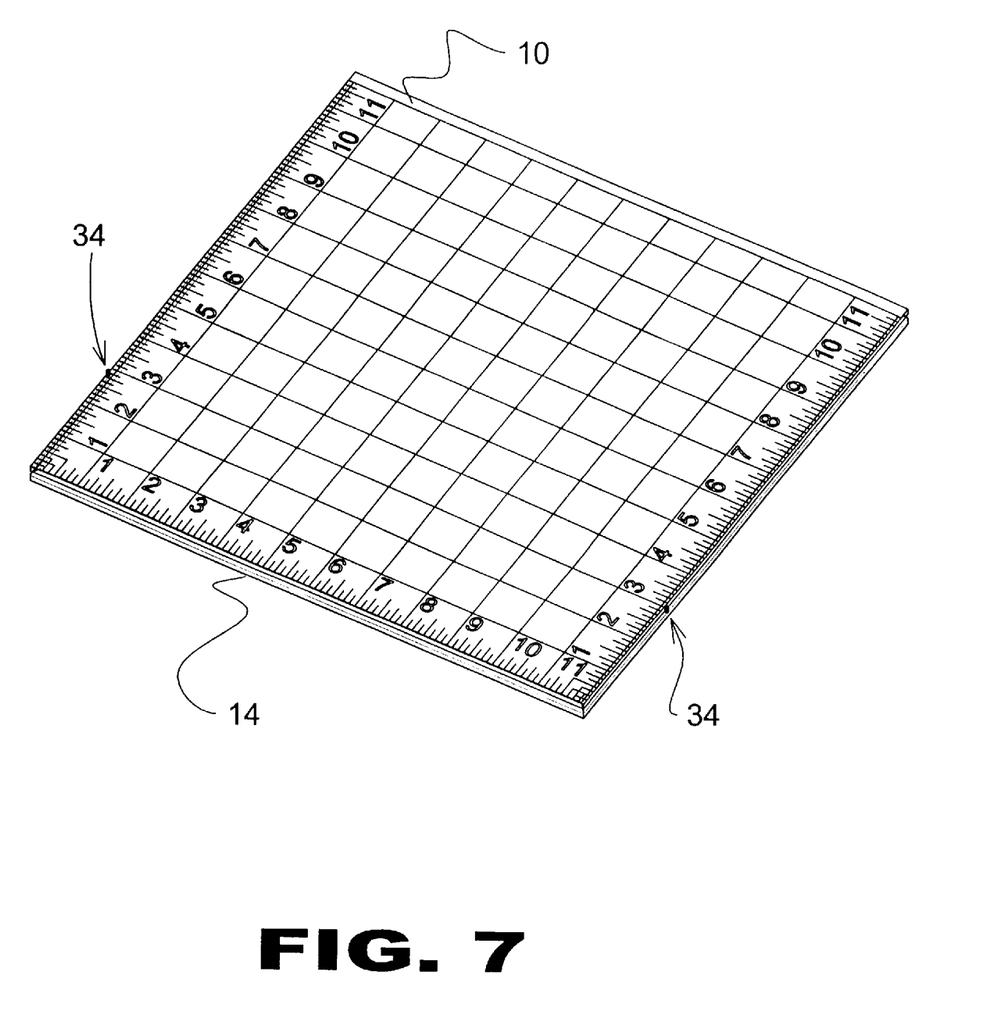
FIG. 7 is a view of a tile being marked with the aid of the present invention.

Turning to FIG. 7, shown therein is a view of a tile to be cut 14 at the bottom being marked with the aid of the present invention 10 on the top. After the present invention 10 is pressed on top of the tile 14 to be cut, it is easy to mark and see the location of the two cut points 34 on the sides.

Figure 8:
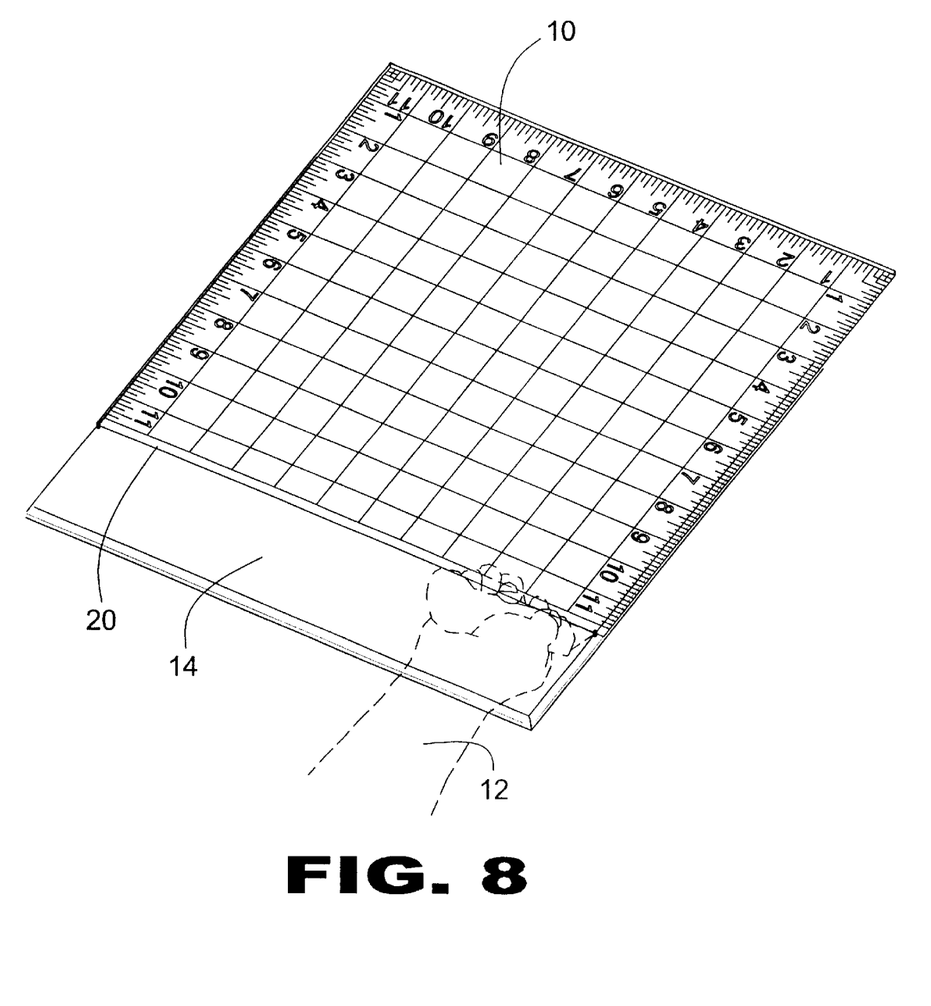
FIG. 8 is a view of a tile being cut using the metal edge of the clear tile as a guide.

Turning to FIG. 8, shown therein is a view of a tile 14 being cut using the metal edge 20 of the present invention 10 as a guide. For short cuts, the metal edges 20 of the present invention can be used conveniently to guide a blade in cutting a tile 14 as shown. The hand of worker 12 is also shown.

Figure 9:
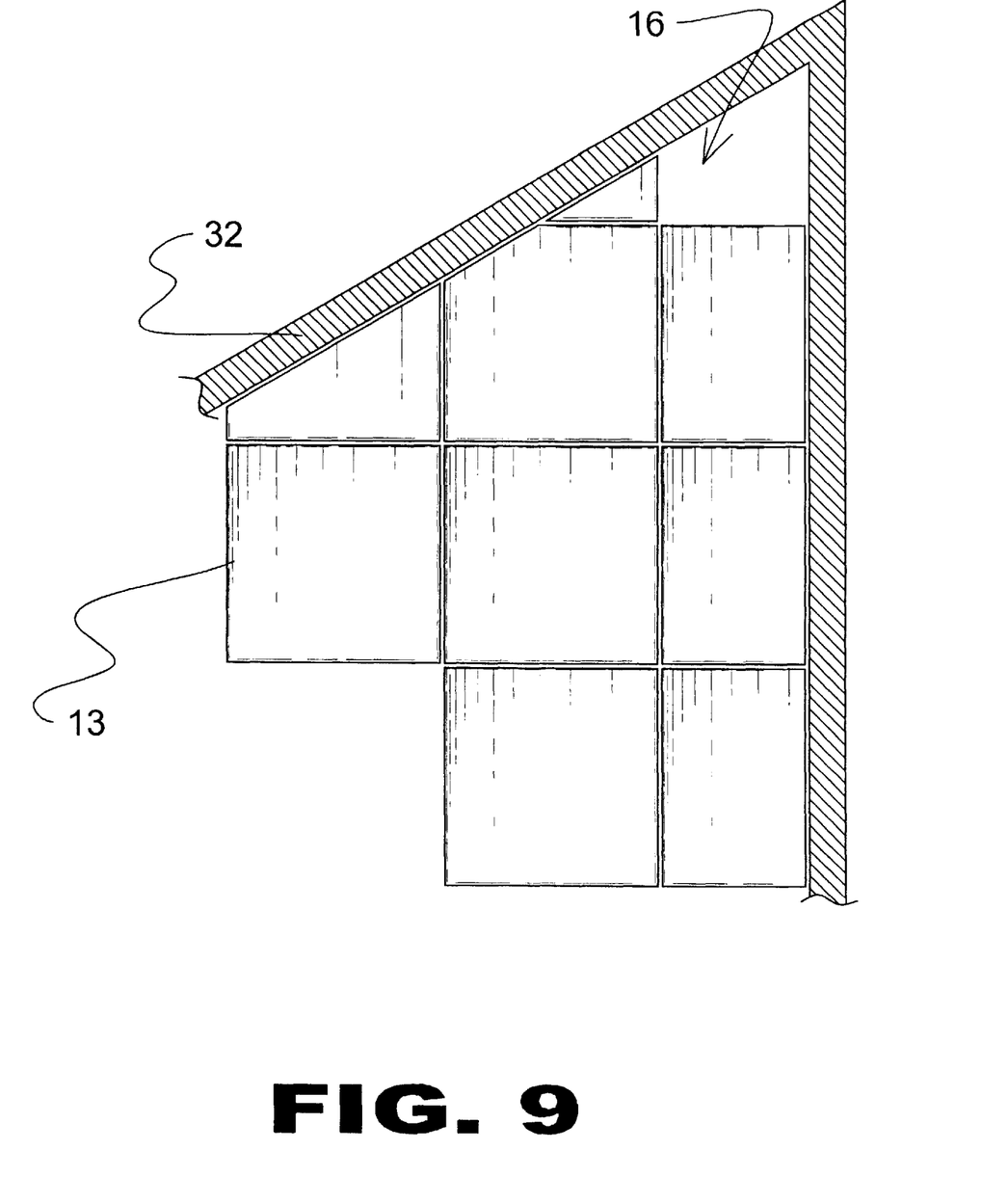
FIG. 9 is another view of a tile floor under construction.

Turning to FIG. 9, shown therein is another view of a tile floor 13 under construction. This view shows an example of a corner space that is hard to measure. Instead of taking measurements directly, the present invention would allow a user to trace the shape of the next tile space 16 using a wet pen 38. Afterwards the trace is transferred on to the back of a tile by pressure. Wall 32 is also shown.

Figure 10:
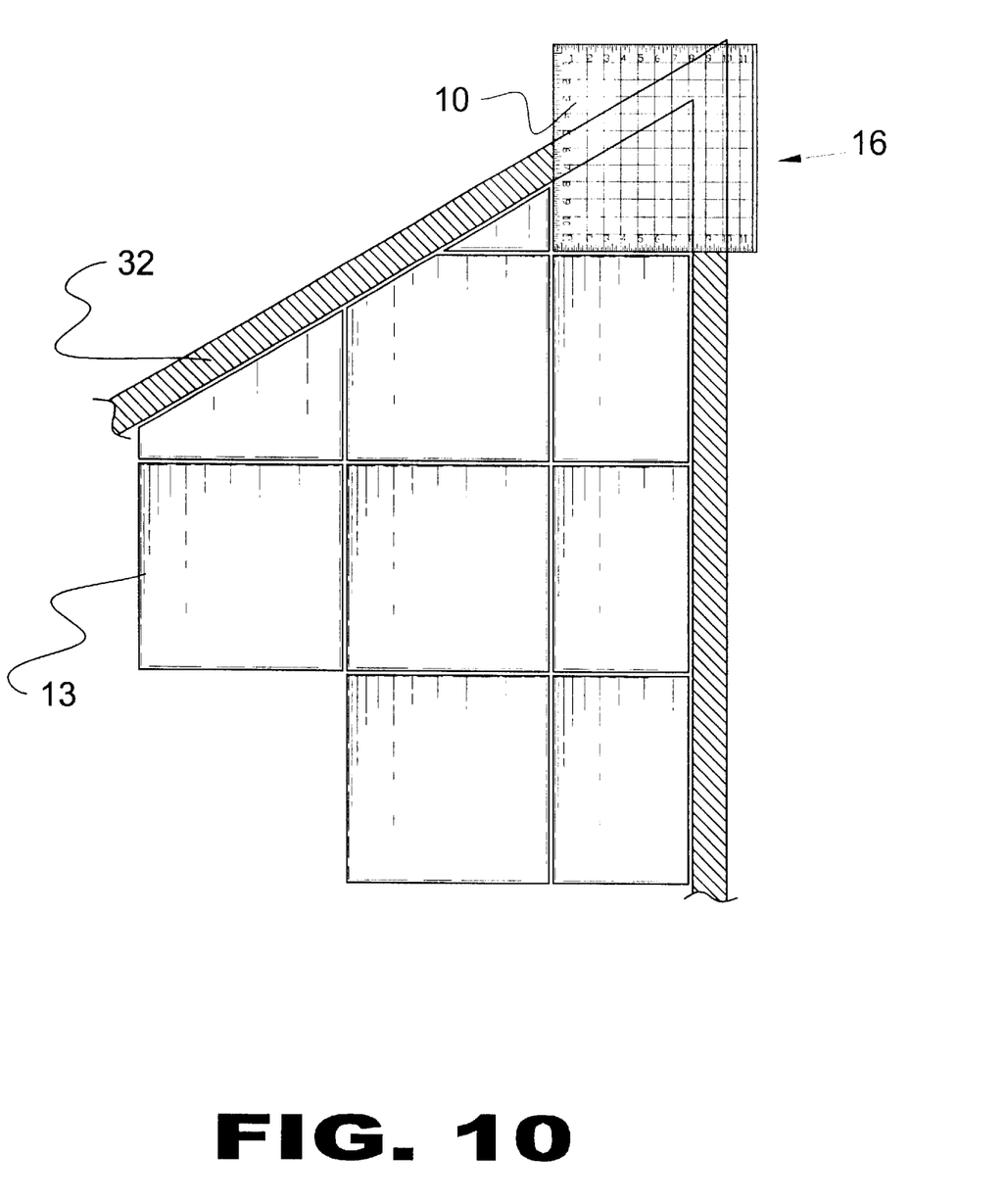
FIG. 10 is another view of the present invention in use.

Turning to FIG. 10, shown therein is another view of the present invention 10 in use. For an awkwardly shaped tile space, the present invention 10 can be used as a template to trace out the shape of the tile space using a wet pen 38. The trace can be transferred to the bottom of a tile by pressing on the present invention 10. To trace the outline, the present invention 10 is first laid on top of the tile space 16 as shown. Wall 32 and tiles 13 which have previously been laid are also shown.

Figure 11:
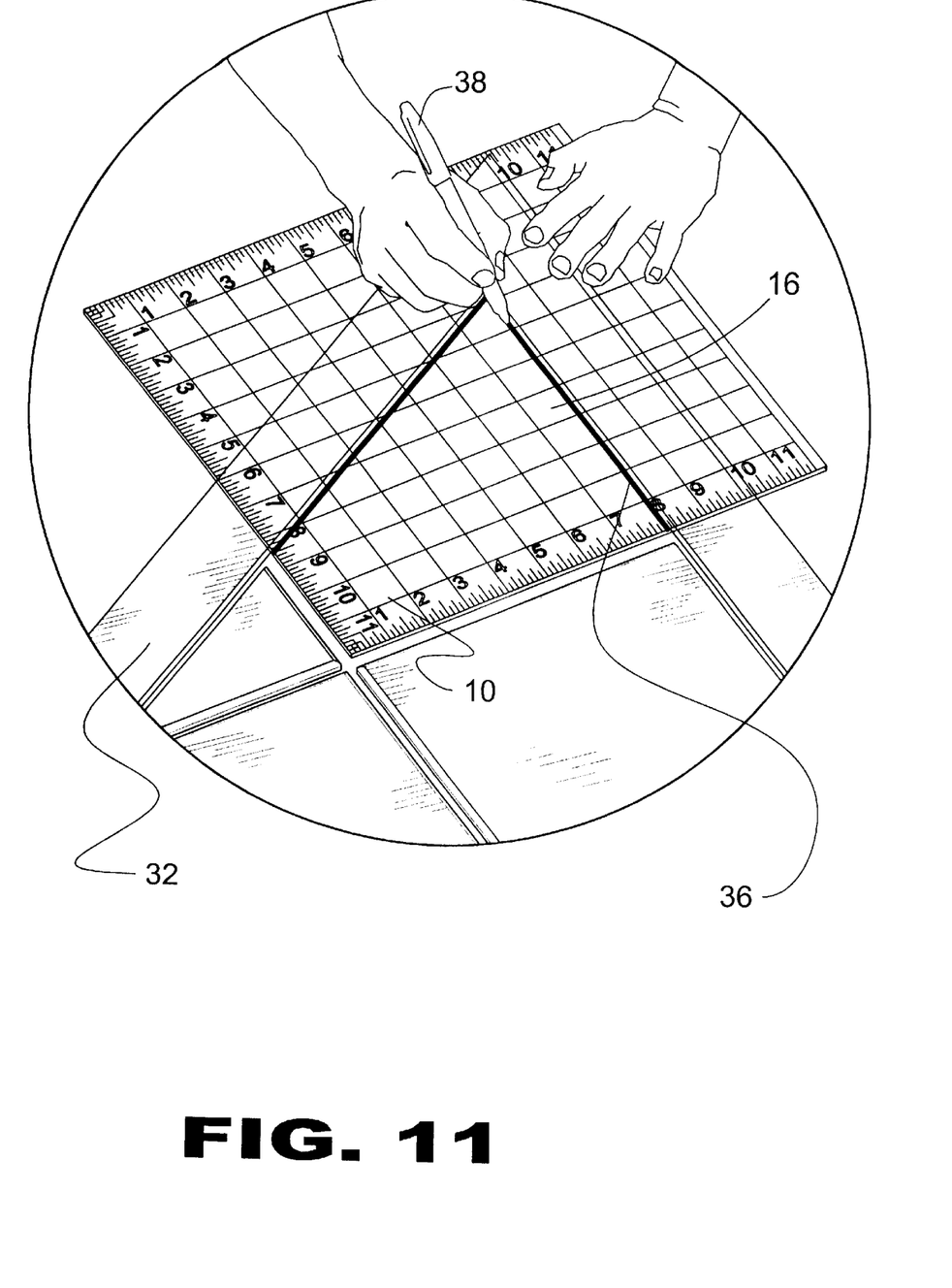
FIG. 11 is a view of a tile space being traced.

Turning to FIG. 11, shown therein is a view of a tile space 16 being traced. The present view shows the outline of a tile space being traced 36 on top of the present invention 10 using a wet pen 38. A boundary or structure 32 is also shown.

Figure 12:
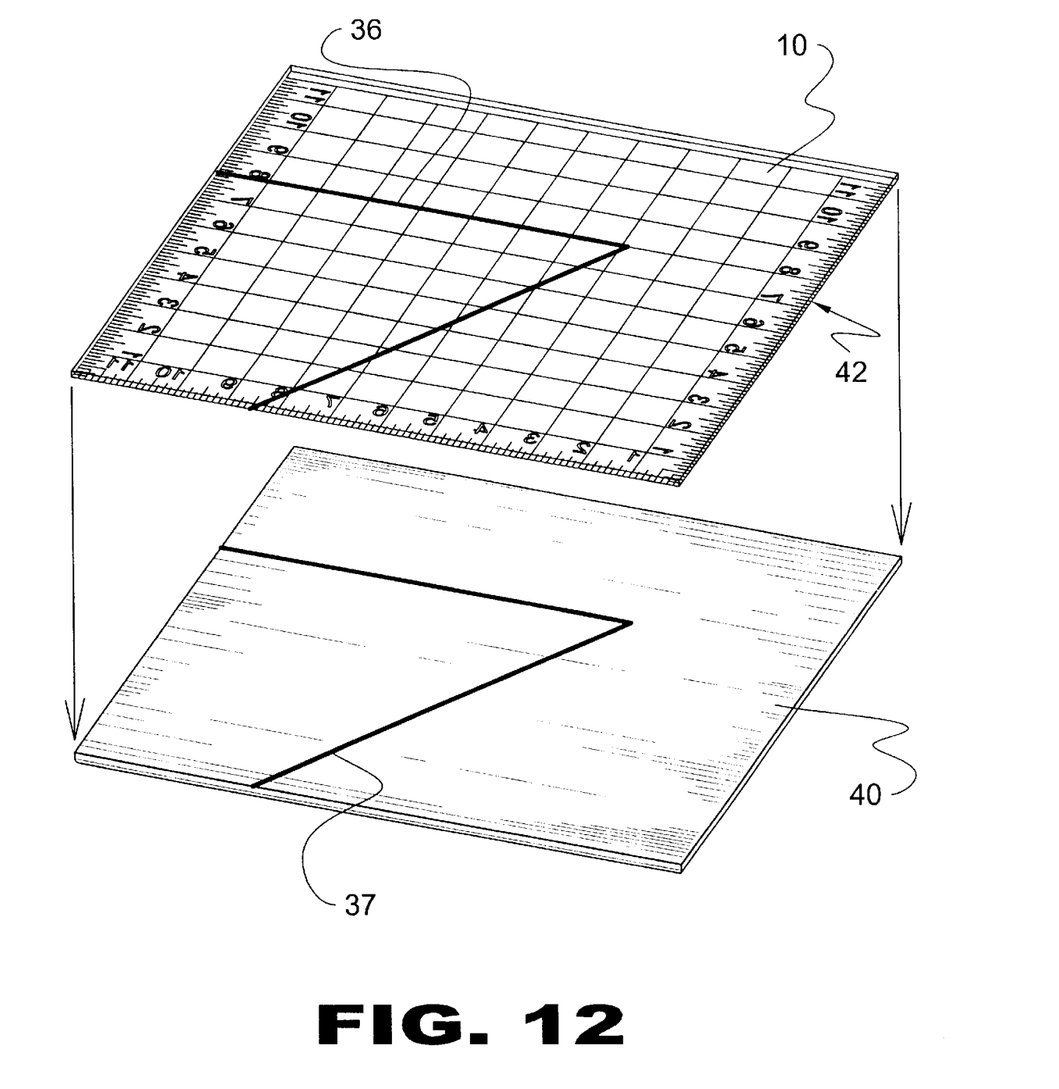
FIG. 12 is a back view of a tile showing the impression of a tile space outline.

Turning to FIG. 12, shown therein is a back view of a tile 40 showing the impression 37 of a tile space outline. Once the wet trace 36 of a tile space is outlined on top 42 of the present invention 10, the trace 36 can be transferred to the back 40 of a tile to be cut by placing the top side 42 of the present invention on the back 40 of the tile and pressing on the present invention 10 to form impression 37 of the trace line 36.

I claim:

1. An apparatus for providing a template for cutting and laying floor tile, comprising:
 a) a substantially square piece of transparent plastic, said piece being flexible, said piece having a top side and a bottom side;
 b) wherein each side of said piece is about one foot in length;
 c) a metal edge disposed on one side of said piece to provide a cutting edge;
 d) a display of twelve-inch ruler disposed on the remaining three sides of said piece to provide measurements on the three edges; and,
 e) a display of a one-inch square grid equally spaced about said piece to provide a grid background for tracing thereon.

2. A method of using a template for cutting and laying floor tile, comprising the steps of:

a) forming a substantially square piece of transparent plastic, the piece of plastic being flexible and having a top side and a bottom side wherein each side of said piece of plastic is about one-foot in length;

b) placing a metal edge on one side of the piece of plastic to provide a cutting edge;

c) displaying a twelve-inch ruler on the remaining three sides of the plastic to provide measurements on the three edges;

d) displaying a one-inch square grid equally spaced about the piece of plastic to provide a grid background for tracing thereon;

e) placing the piece of plastic on the next tile space to be cut and marking the measurements of the next tile space onto the piece of plastic;

f) placing the piece of plastic adjacent the next piece of tile to be cut and transferring the measurement from the piece of plastic to the next piece of tile to be cut; and, g) cutting the next piece of tile to the appropriate size.

3. A method of using a template for cutting and laying floor tile, comprising the steps of:

a) forming a substantially square piece of transparent plastic, the piece of plastic being flexible and having a top side and a bottom side wherein each side of said piece of plastic is about one-foot in length;

b) placing a metal edge on one side of the piece of plastic to provide a cutting edge;

c) displaying a twelve-inch ruler on the remaining three sides of the piece of plastic to provide measurements on the three edges;

d) displaying a one-inch square grid equally spaced about the piece of plastic to provide a grid background for tracing thereon;

e) placing the bottom of the piece of plastic on the next tile space to be cut and tracing the measurements of the next tile space onto the top of the piece of plastic;

f) placing the top of the piece of plastic against the bottom of the next piece of tile to be cut and transferring the tracing from the piece of plastic to the next piece of tile to be cut; and, g) cutting the next piece of tile to the appropriate size.

4. The apparatus of claim 3, further comprising the step of using a wet pen to make the tracing onto the piece of plastic to permit easy transfer to the next piece of tile to be cut.

* * * * *